(12) United States Patent  
Hirai et al.

(10) Patent No.: US 7,787,078 B2  
(45) Date of Patent: Aug. 31, 2010

(54) LCD DEVICE SUPPRESSING A PARALLAX PROBLEM

(75) Inventors: Yoshihiko Hirai, Kawasaki (JP); Kenichiro Naka, Kawasaki (JP)

(73) Assignee: NEC LCD Technologies, Ltd. (JP)

( * ) Notice: Subject to any disclaimer, the term of this patent is extended or adjusted under 35 U.S.C. 154(b) by 31 days.

(21) Appl. No.: 11/133,424

(22) Filed: May 19, 2005

(65) Prior Publication Data

US 2005/0259197 A1 Nov. 24, 2005

(30) Foreign Application Priority Data

May 21, 2004 (JP) .............................. 2004-151925

(51) Int. Cl.  
*G02F 1/1335* (2006.01)

(52) U.S. Cl. ...................... 349/113; 349/158; 349/114; 349/96

(58) Field of Classification Search ................. 349/106, 349/113, 158, 96, 114, 122, 123  
See application file for complete search history.

(56) References Cited

U.S. PATENT DOCUMENTS

| | | | | |
|---|---|---|---|---|
| 4,533,214 A | * | 8/1985 | Penz et al. | 349/102 |
| 6,030,546 A | * | 2/2000 | Fujimoto et al. | 252/299.6 |
| 6,147,728 A | * | 11/2000 | Okumura et al. | 349/106 |
| 6,373,538 B2 | * | 4/2002 | Okumura et al. | 349/106 |
| 6,515,729 B1 | * | 2/2003 | Hoshino | 349/158 |
| 6,717,641 B2 | * | 4/2004 | Arai | 349/114 |
| 7,088,405 B2 | * | 8/2006 | Kotchick et al. | 349/114 |
| 2002/0033916 A1 | * | 3/2002 | Umemoto | 349/113 |

FOREIGN PATENT DOCUMENTS

| | | |
|---|---|---|
| CN | 1159230 | 9/1997 |
| JP | 56-066824 | 6/1981 |
| JP | 59-187320 | 10/1984 |
| JP | 11-249108 | 9/1999 |
| JP | 2000-122064 | 4/2000 |
| JP | 2001-174829 | 6/2001 |
| JP | 2002-297054 | 9/2002 |
| JP | 2003-156756 | 5/2003 |
| KR | 2001-0002111 | 5/2001 |
| KR | 2001-0045450 | 5/2001 |
| KR | 2002-0057023 | 11/2002 |

OTHER PUBLICATIONS

Japanese Official Action dated Jan. 5, 2010.

* cited by examiner

*Primary Examiner*—Thoi V Duong  
(74) *Attorney, Agent, or Firm*—Hayes Soloway P.C.

(57) ABSTRACT

An LCD device includes front substrate and rear substrate sandwiching therebetween an LC layer, front polarizing film and rear polarizing film disposed on the front side of the front substrate and the rear side of the rear substrate, respectively, and a reflecting film disposed on the rear side of the rear polarizing film. The distance between the LC layer and the reflecting film is set at 0.8 mm or smaller, to solve a parallax problem.

23 Claims, 7 Drawing Sheets

LCD DEVICE SUPPRESSING A PARALLAX PROBLEM

BACKGROUND OF THE INVENTION (a) Field of the Invention

The present invention relates to an LCD (liquid crystal display) device and, more particularly, to an LCD device of a transflective or reflective type having two polarizing films.

(b) Description of the Related Art

An LCD device generally includes a light source, and a light valve for controlling transmission or interception of the light emitted by the light source, on a pixel-by-pixel basis. An active-matrix-drive LCD has a light valve which controls an array of TFTs (thin film transistors) or MIM (metal-insulator-metal) diodes in the pixels and achieves a high-density and high-quality image display for the LCD device.

LCD devices are generally categorized in two types: a transmissive LCD device having therein a backlight unit as a light source; and a reflective LCD device having therein a reflecting film which reflects external light incident onto the LCD device and thus functions as a light source. The reflective LCD device has the advantages of lower power dissipation, and smaller thickness and weight compared to the transmissive LCD device, due to disuse of backlight unit in the reflective LCD device, and is mainly used in a portable terminal which requires smaller size and weight. On the other hand, the transmissive LCD device is superior to the reflective LCD device in that the transmissive LCD device can be well observed in a dark environment.

There is another type of the LCD device, known as a transflective LCD device, which has the advantages of both the reflective and transmissive LCD devices. Patent Publication JP-A-2003-156756 describes a transflective LCD device including a transmission area or transparent area in a part of pixel array formed on a rear substrate, and a reflection area in another part of the pixel array. In the reflection area, a pixel electrode has a function of polarizing the reflected light, whereby only a single polarizing film is disposed in the reflection area. Thus, this type of the LCD device is also referred to as a single-polarizing-film LCD device.

The LCD device described in the patent publication can be used as a reflective LCD device in a bright environment while turning off the backlight unit to operate the LCD device in a reflective mode, and as a transmissive LCD device in a dark environment while turning on the backlight unit to operate the LCD device in a transmissive mode. Thus, the transflective LCD device has the advantage of the reflective LCD device as to the lower power dissipation in the bright environment as well as the advantage of the transmissive LCD device as to the higher image-display capability in the dark environment.

It is noted that incident light passing through the reflection area has a path length different from the path length of incident light passing through the transmission area, because the former incident light passes twice through the liquid crystal (LC) layer whereas the latter incident light passes only once through the LC layer. This difference in the path length differentiates the retardation of the LCD device between the reflection area and the transmission area, and thus makes it difficult to optimize the intensity of the output light. Another problem is also involved in that the contrast ratio is reduced, or a specific color is observed in the monochrome image, during operation either in the reflective mode or in the transmissive mode.

For solving the above problems in the transflective LCD device, there are two known countermeasures; one which provides a large step difference between the reflection area and the transmission area; and another which optimizes the reflectance of an optical compensation layer. However, since those problems are essential to the LCD device having a single polarizing film, the known countermeasures do not provide a complete solution, and can only reduce the influence by the problems while increasing the costs of the LCD device.

In addition to the single-polarizing-film LCD device as described above, there is another type of transflective LCD device, referred to herein as a double-polarizing-film LCD device, wherein a polarizing film is provided on each of the front side of the front substrate and the rear side of the rear substrate, and wherein a reflection film (reflection plate) is provided on the rear side of the polarizing film disposed on the rear side of the rear substrate. This type of the transflective LCD device can be designed to optimize the intensity of the output light both in the transmissive mode and in the reflective mode, and prevent the reduced contrast ratio and coloring in the monochrome image.

In the double-polarizing-film LCD device, however, there are a parallax problem wherein the image is duplicated on the screen as viewed from the slanted direction in the reflective mode, a mixed-color problem wherein an undesirable color appears on the screen, and a reduced-luminance problem wherein some pixels have reduced luminances. These problems in the transflective LCD device are common to the reflective LCD device.

SUMMARY OF THE INVENTION

In view of the above, it is an object of the present invention to provide a double-polarizing-film LCD device which is capable of suppressing the parallax problem, mixed-color problem and reduced-luminance problem as encountered in the conventional transflective LCD device and the conventional reflective LCD device.

The present invention provides a liquid crystal display (LCD) device having a front substrate including a front polarizing film disposed on a front side of the front substrate, a rear substrate including a rear polarizing film disposed on a rear side of the rear substrate, a liquid crystal (LC) layer sandwiched between the front substrate and the rear substrate, and a reflecting film disposed on a rear side of the rear polarizing film, wherein a distance between the LC layer and the reflecting film is not larger than 0.8 mm.

In accordance with the LCD device of the present invention, the distance not larger than 0.8 mm between the LC layer and the reflecting film allows the distance between the duplicated images formed by a parallax to be quite small, thereby suppressing the parallax, mixed-color and reduced-luminance problems, upon display of the image in a reflecting mode.

PREFERRED EMBODIMENTS OF THE INVENTION

Before describing preferred embodiments of the present invention, the principle of the present invention will be described hereinafter for a better understanding of the present invention.

The present inventor conducted experiments and analyses for solving the above parallax, mixed-color and reduced-luminance problems in the double-polarizing-film LCD devices of the reflective type and the transflective type during operation in the reflection mode.

Figure 7:
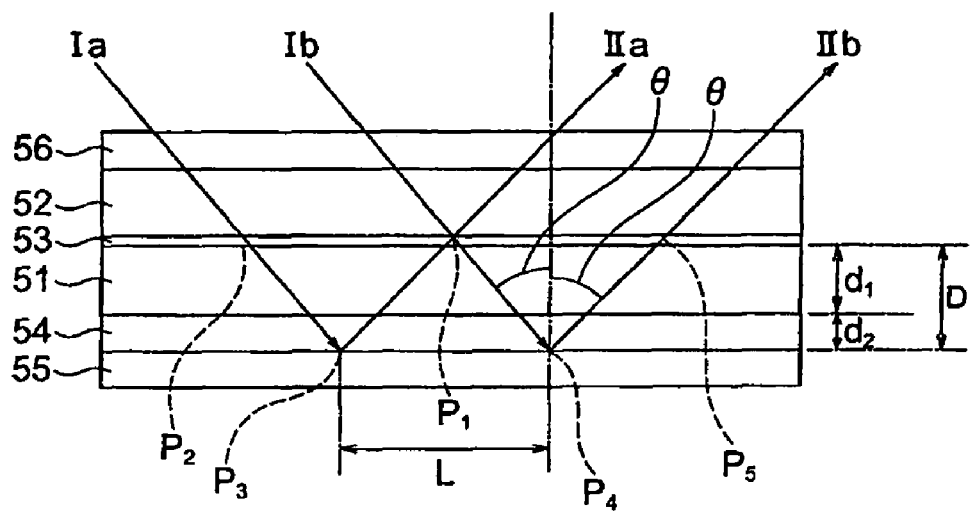
FIG. 7 is a explanatory sectional view of an LCD device for showing the incident light and reflected light.

FIG. 7 shows a typical LCD panel, or a light valve, in a double-polarizing-film LCD device, wherein the LCD panel 50 includes a rear substrate 51, a front substrate 52, and a liquid crystal (LC) layer 53 sandwiched therebetween. The LCD panel defines a plurality of pixels on the screen by the function of the front substrate. The rear substrate 51 is associated with a rear polarizing film (polarizing plate) 54 and a reflecting film (reflecting plate) 55, which are consecutively arranged on the rear side of the rear substrate 51. The front substrate 52 is associated with a front polarizing film 56 on the front side thereof. In FIG. 7, d1 and d2 denote the thicknesses of the rear substrate 51 and the rear polarizing film 54, respectively, and P1 to P5 denote respective positions within the LCD panel 50. The LCD panel 50 operates in a TN mode and is normally white.

In the analysis of the causes of the parallax in the LCD panel 50, it is noted that external light beams Ia and Ib incident onto the LCD panel 50 pass through the LC layer 53, and are reflected on the surface of the reflecting film 55 to pass again through the LC layer 53 as reflected light beams IIa and IIb. The reflected light beams IIa and IIb are generally dispersed light due to the dispersing property of the typical reflecting film 55. Thus, the observer observes the reflected light beams IIa and IIb as if they are emitted from the surface of the reflecting film 55.

Assuming that a pixel at point P1 is ON and all the other pixels are OFF, the light beams passing through the pixel at point P1 in the LC layer 53 include the reflected light beam IIa reflected at point P3 and the incident light beam Ib entering through point P1. The incident light beam Ib is reflected at point P4 to advance as the reflected light beam IIb. The observer observes both the reflected light beams IIa and IIb, and thus perceives images on both points P3 and P4. More specifically the observer observes and perceives duplicated images of a single object.

The thickness of the LC layer 53 is generally around 5 μm, which is considerably smaller than the thicknesses d1 and d2. Thus, the distance (L) between both the duplicated images can be approximated by:

$$2 \cdot (D \tan \theta),$$

neglecting the thickness of the LC layer 53, wherein θ is the incident angle of the light beam with respect the normal line of the substrates and D is an effective thickness of the rear substrate 51 and expressed by D=d1+d2. As understood from the expression, a larger effective thickness D of the rear substrate (referred to as effective rear-substrate thickness, hereinafter) as well as a larger incident angle θ causes a larger distance L, which is undesirable due to an increased perception of the duplicated images.

On the other hand, the incident light beam Ia to be reflected at point P3 passes through the LC layer 53 at a different pixel located on point P2. In a color LCD device having color filters, since adjacent pixels have different colors, the duplicated images also cause a mixed-color problem and a reduced-luminance problem. Thus it is desired that the effective rear-substrate thickness be smaller in order for suppression of the parallax, mixed-color and reduced-luminance problems.

In an electronic calculator, for example, the problems of parallax etc. are not critical to the observer because the calculator has an LCD device displaying thereon characters or numerals of a large size with a monochrome image. Thus a larger value of L is not a significant problem. However, in an active-matrix-drive LCD device, the problems of parallax etc. are critical because the LCD device has a smaller pitch of the pixels and represents the characters or numerals with a color image.

In view of the above findings and analyses, the present invention employs a configuration wherein an array substrate mounting thereon an array of switching devices is used as the front substrate, and a glass or plastic substrate having a smaller thickness is used as the rear substrate. The front substrate on which switching devices are arranged may be a so-called COA (color-filter on active matrix) substrate on which color filters are mounted.

Figure 8:
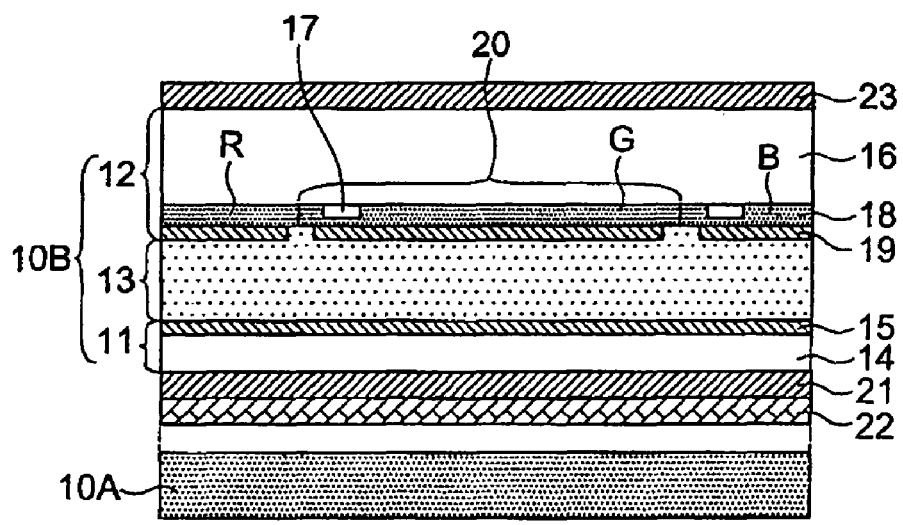
FIG. 8 is a sectional view of a double-polarizing-film LCD device of the first embodiment having a COA front substrate.

The inventor conducted experiments for investigating as to the effective rear-substrate thickness which causes a significant parallax, thereby establishing the relationship between the effective thickness D and the parallax. FIG. 8 shows an LCD device according to a first embodiment of the present invention and used in the experiments. The LCD device of FIG. 8 includes a backlight unit 10A, and an LCD panel 10B used as a light valve. The LCD panel 10B includes a rear substrate 11, a front substrate 12 implemented as a COA substrate, and an LC layer 13 sandwiched between both the substrates 11 and 12.

The rear substrate 11 includes a transparent substrate body 14, and a counter electrode 15 formed thereon. The transparent substrate body 14 is made of glass or plastics having a small thickness and thus has only a small mechanical strength. The front substrate 12 includes a transparent substrate body 16, an array of switching devices 17 formed thereon, color filters 18 formed on the switching devices 17, and pixel electrodes 19 formed on the color filters 18.

The switching devices 17, color filters 18 and pixel electrodes 19 are disposed in respective pixels 20. The switching devices 17 may be TFTs (thin film transistors) or TFDs (thin film diodes), such as MIM diodes. The rear substrate 11 mounts on the rear side thereof a rear polarizing film 21, reflecting film 22 consecutively arranged on the rear substrate 11. The front substrate 12 mounts on the front side thereof a front polarizing film 23.

The experiments were conducted using TFT-LCD devices while changing the thickness of the rear substrate in the LCD devices, to observe occurrence of the parallax. The thickness of each rear substrate 11 was adjusted by polishing the rear surface of the transparent substrate body 14. TFT-LCD devices of 10.4-inch VGA type had a pixel pitch of 0.33 mm, whereas TFT-LCD devices of 14-inch XGA type had a pixel pitch of 0.28 mm.

The experiments for the TFT-LCD devices having a pixel pitch of 0.33 mm revealed that a large effective rear-substrate thickness as large as 0.8 mm or above caused a large parallax which prevented the TFT-LCD device from a practical use thereof. An effective rear-substrate thickness between 0.6 mm and 0.8 mm caused some degree of parallax which allowed the TFT-LCD device to be in practical use. An effective rear-substrate thickness below 0.6 mm did not reveal a significant parallax, and caused no practical trouble. The experiments for the TFT-LCD devices having a pixel pitch of 0.28 mm revealed that the effective rear-substrate thickness should be reduced by about 0.1 mm compared to the cases of the corresponding TFT-LCD devices having a pixel pitch of 0.33 mm.

The present inventor then studied the practical configurations of the polarizing film and the reflecting film. The front polarizing film 23 disposed in front of the front substrate 12 may be an ordinary polarizing film generally used for this purpose, such as SQ-1852AP (trade mark) from Sumitomo Chemical Inc. An antireflection (AR) film including a plurality of stacked layers may be formed on the surface of the front polarizing film for suppressing reflection of direct sunlight to thereby improve the image quality.

Typical examples of the combination of the rear substrate 11, rear polarizing film 21 and reflecting film 22 include:
(1) rear substrate/adhesive layer/rear polarizing film/adhesive layer/reflecting film;
(2) rear substrate/adhesive layer/rear polarizing film/adhesive layer/luminance increasing film; and
(3) rear substrate/adhesive layer/rear polarizing film/adhesive layer/luminance increasing film/reflecting film.

The reflecting film 22 may be any of all-reflection type which does not pass therethrough the incident light, transflective type which passes therethrough a significant part of the incident light, and low-reflection type which passes therethrough most part of the incident light. The reflecting film 22 may be basically a polymer film, onto which a metal, such as aluminum, or a dielectric stacked film is formed by evaporation or other suitable technique. The reflecting film may have a typical thickness of 50 to 100 μm.

The reflected light reflected by the rear polarizing film 21 and the reflecting film 22 adhered onto the rear surface of the rear substrate 11 should not be mirror-surface-reflected light and should be dispersed-light. The dispersed light may be obtained by a reflecting film having convex and concave portions on the surface thereof, or may be obtained more easily by an adhesive layer into which fine particles are dispersed.

The structure of the combination (1) as described above may be such that a polarizing film associated with a reflecting film is adhered on to the rear side of the rear substrate 11. The effective rear-substrate thickness in this structure is the sum of the thicknesses of the rear substrate, adhesive layer, rear polarizing film, and adhesive layer. Typical thicknesses of the adhesive layer and the rear polarizing film are 20 to 40 μm and 100 to 200 μm, respectively. Thus, a typical effective rear-substrate thickness is 140 to 280 μm plus the thickness of the rear substrate. In the combination (1), a product SJI862AP AS-011 (reflectance=18.3%, and transmittance=21.2%) from Sumitomo Chemical Inc. may be used as the transflective reflecting film, for example.

The luminance increasing film in the structures of combinations (2) and (3) may be eccentric-separation/high-transmission polarizing film obtained as an application of cholesteric liquid crystal, and product "DBEF" from Sumitomo Chemical Inc. may be used for this purpose. The thickness of the luminance increasing film may be generally 100 to 200 μm. The effective rear-substrate thickness in the structure of the combinations (2) and (3) is the sum of the total thicknesses of the rear substrate, adhesive layer, rear polarizing film, adhesive layer and the luminance increasing film, due to the reflection occurring on the rear surface of the luminance increasing film. Thus, the typical thickness of the effective rear-substrate thickness is 240 to 480 μm plus the thickness of the rear substrate 11.

The rear substrate 11 has a smaller thickness compared to the COA substrate implemented as the front substrate 12. The transparent substrate body 14 may be made of glass or plastics. Examples of the material for the plastic substrate body include polycarbonate (PC) resin and polyethersulfone resin, and are not limited thereto. A typical thickness of the transparent substrate body 14 is 0.1 to 0.2 mm.

The lower limit of the effective rear-substrate thickness D is not determined to a particular value in view of the display performance, and is generally 100 μm due to the restriction by available materials. If the transparent substrate body 14 is to be made of plastics, the lower limit of the thickness of the transparent substrate body is 50 μm in a practical case. In view that the lower limit of the total thickness of the rear polarizing film 21 and adhesive layer is 70 μm, the effective rear-substrate thickness D is 120 μm in this case.

Although not illustrated in FIG. 8, an alignment film is disposed on each of the front side of the counter electrode 15 and the rear side of the pixel electrodes 19. The alignment film is generally formed by coating with polyimide resin, burning the coated film and rubbing the burned film. Alternatively, the alignment film may be formed by a low-temperature process using optical alignment or a plasma treatment. Injection of liquid crystal within the LCD panel may be conducted by vacuum-injection after burning a seal member sandwiched between the substrates, or by dropping a droplet of the liquid crystal on a substrate followed by bonding together both the substrates 11 and 12 and UV-curing the seal member between the substrates 11 and 12.

As described above, the parallax problem etc. of the transflective or reflective LCD device having a pair of polarizing films strongly depend on the effective rear-substrate thickness D, and a suitable effective rear-substrate thickness is 0.8 mm or lower, a preferable effective rear-substrate thickness is 0.7 mm or lower, and a more preferable effective rear-substrate thickness is between 0.1 mm and 0.5 mm, which involves substantially no parallax problem etc.

It is preferable that the LCD device of the present invention have nematic liquid crystal, and an LCD device operating in a twisted nematic mode, in-plane-switching mode or a vertical alignment mode is particularly suited to this configuration. This is because the pair of polarizing films disposed in front and rear of the LC layer afford a higher contrast ratio and prevent coloring in a monochrome image.

Now, embodiments of the present invention are more specifically described with reference to the accompanying drawings, wherein similar constituent elements are designated by similar reference numerals.

Figure 1:
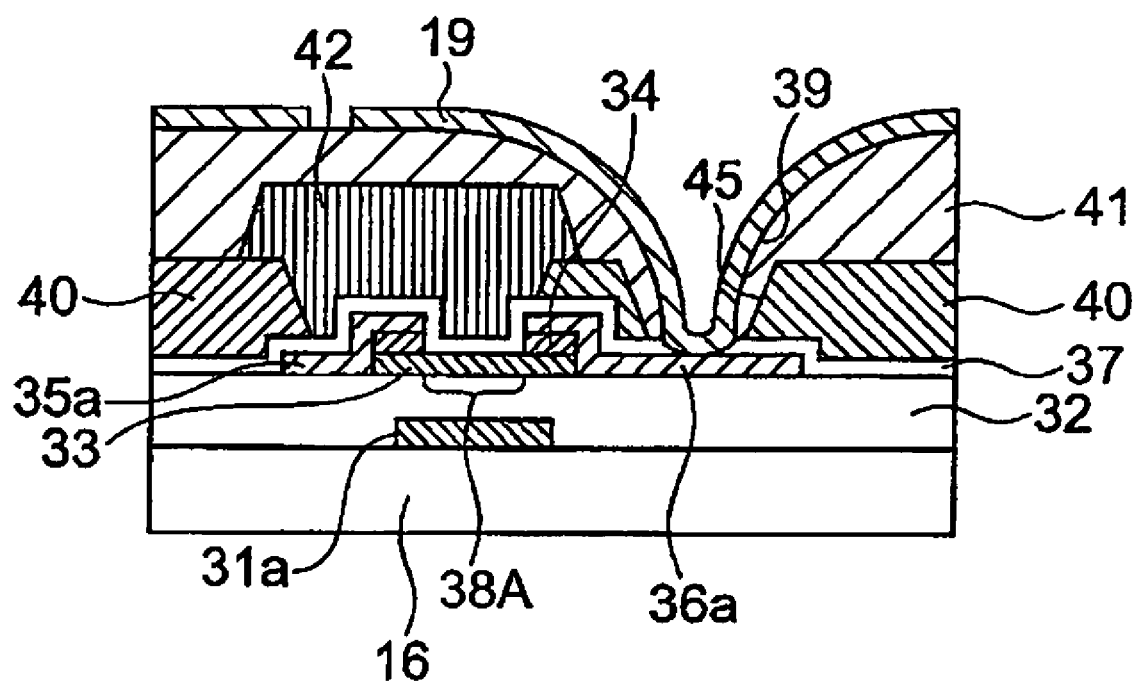
FIG. 1 is a sectional view of a pixel area in a front substrate of an LCD device according to a first embodiment of the present invention.

FIG. 1 shows a front substrate in a transflective LCD device having a pair of polarizing films according to a first embodiment of the present invention. The LCD device of the present embodiment has an overall configuration shown in FIG. 8. The front substrate 12 is configured as a COA substrate and includes switching devices each implemented as a reverse-staggered thin film transistor (TFT).

The front substrate 12 includes a transparent, insulating substrate body, or glass substrate body 16, gate electrodes 31a in the TFTs overlying the glass substrate body 16, a gate insulating film 32 covering the gate electrodes 31a, and semiconductor active layers 33 each formed on the gate insulating film 32 corresponding to the gate electrode 31a. The semiconductor active layer 33 is provided with a source electrode 35a on one edge portion thereof with an intervention of a heavily-doped layer 34, and a drain electrode 36a on the other edge portion thereof with an intervention of another heavily-doped layer 34. The heavily-doped layer 34 is an n-type amorphous silicon layer and herein referred to as an ohmic contact layer. In other words, as understood from the drawing, the ohmic contact layer 34 is etched away on the channel portion of the TFT, and hence this TFT is referred to as a channel-etched TFT.

A passivation layer 37 overlies the source electrodes 35a, drain electrodes 36a and semiconductor active layers 33. On the passivation layer 37, there are provided color filter layers 40 including red, green and blue colors corresponding to respective effective pixel areas. On the passivation layer 37, there is also provided a black matrix 42 for light-shielding the area other than the effective pixel area. At the boundary between the color filter layer 40 and the black matrix 42, the edge of the black matrix 42 overlies the edge of the color filter layers 40. The black matrix 42 is formed as a single layer over the entire area of the LCD panel, and thus strongly adhered onto the glass substrate body 16, substantially without a possibility of peel-off therefrom.

An opening 45 is formed in the color filter layer 40 in this embodiment for receiving therein a pixel electrode 19, which contacts the drain electrode 36a. The opening 45 may be formed in the black matrix 42 instead.

As a material for the color filter layer 40 in the present embodiment, an acrylic-based, pigment-dispersed photoresist, which is generally used for this purpose, may be used. The pigment may be arbitrarily selected from general organic pigments. Examples of the pigment for the black matrix 42 include carbon, titanium oxide and organic black pigment, among which carbon is most preferable. The organic black pigment may be a mixture of several color pigments.

An overcoat layer 41 is formed on the color filter layers 40, black matrix 42 and exposed portions of the passivation layer 37. A contact hole 39 is formed in the overcoat layer 41 and the passivation layer 37 within the opening 45 of the color filter layer 40, exposing a portion of the drain electrode 36a. The pixel electrode 19 is formed on the overcoat layer 41 and within the contact hole 39 to connect to the drain electrode 36a. The drain electrode 36a functions as a lead electrode of the drain to the pixel electrode 19.

Figure 2A:
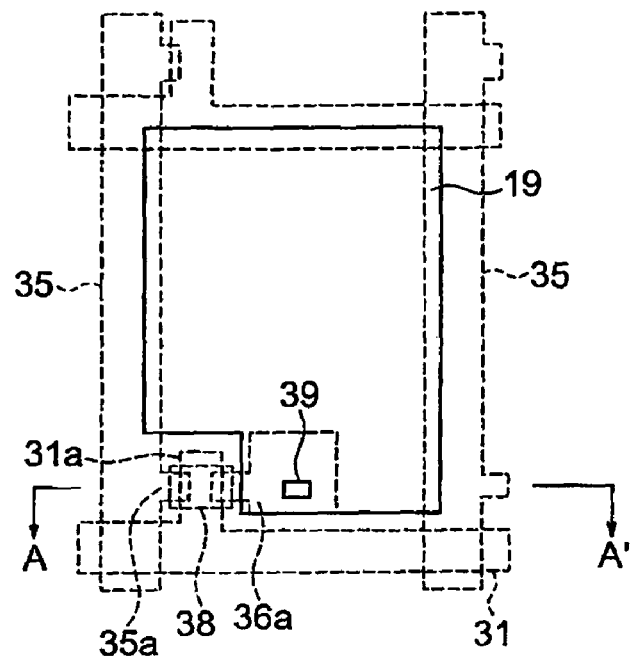
FIGS. 2A and 2B are top plan views of the pixel area in the front substrate shown in FIG. 1.

FIG. 2A shows the structure of a pixel including interconnections and electrodes in the LCD device having the front substrate 12 shown in FIG. 1. It is to be noted that FIG. 1 corresponds to the view taken along line A-A' in FIG. 2A. In FIG. 2A, each gate line 31 and each source line or data line 35 extend perpendicular to one another while surrounding the pixel electrode 19. TFT 38 is disposed in the vicinity of each intersection between a gate line 31 and a data line 35 and outside the area for the pixel electrode 19. The gate electrode 31a and the source electrode 35a are connected to a corresponding gate line 31 and a corresponding data line 35a, respectively. In the drawing, 36a and 39 denote the drain electrode and the contact hole, respectively.

Figure 2B:
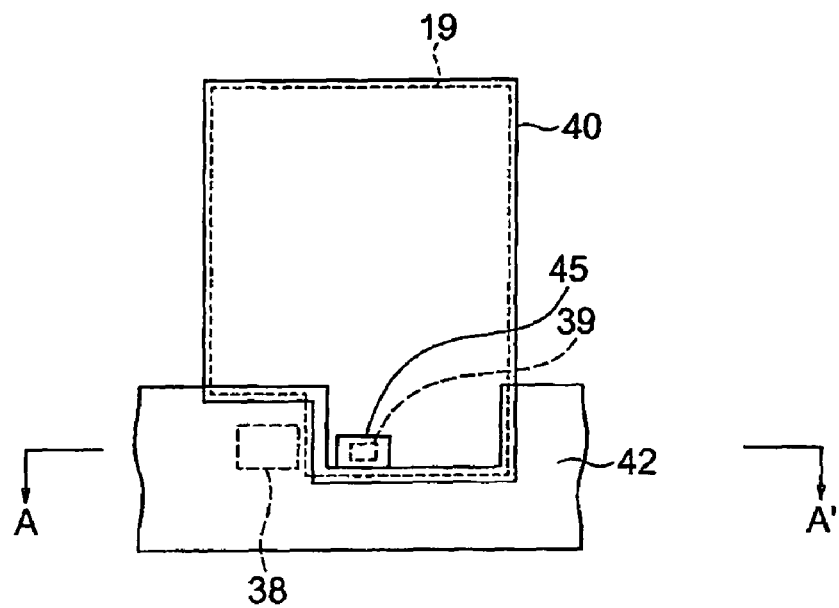

FIG. 2B shows a color filter layer 40 and a portion of the black matrix 42 in the pixel shown in FIG. 2A. The color filter layer 40 opposes the entire area of the pixel electrode 19 except for an opening 45 corresponding to the contact hole 39. The black matrix 42 is disposed outside the area of the pixel electrode 19 while shielding the TFT 38 and gate lines 31.

In FIG. 8, the counter substrate or rear substrate 11 in the present embodiment includes a 0.2-mm-thick transparent substrate body 14 made of plastics. On the rear side of the rear substrate 11, there is provided a layered structure including adhesive layer (not shown)/rear polarizing film 21/adhesive layer (not shown)/luminance-increasing layer (not shown)/reflecting film 22, as a practical example of the combination of the polarizing film 21 and reflecting film 22. The reflecting film 22 is implemented by a low-reflective film formed thereon a high-refractive-index film such as a titanium oxide film. The luminance-increasing film may be DBEF (trade mark) from Sumitomo-3M Inc.

The effective rear-substrate thickness D in the present embodiment is the sum of the thicknesses of the rear substrate 11, adhesive layer, rear polarizing film 21, and adhesive layer. Assuming that the thicknesses of the rear substrate 11, adhesive layer, rear polarizing film 21 are 0.2 mm, 20 μm, and 100 μm, respectively, the effective rear-substrate thickness D is 340 μm. The front polarizing film 23 is a polarizing film on which an anti-reflection coat is formed.

Figure 3:
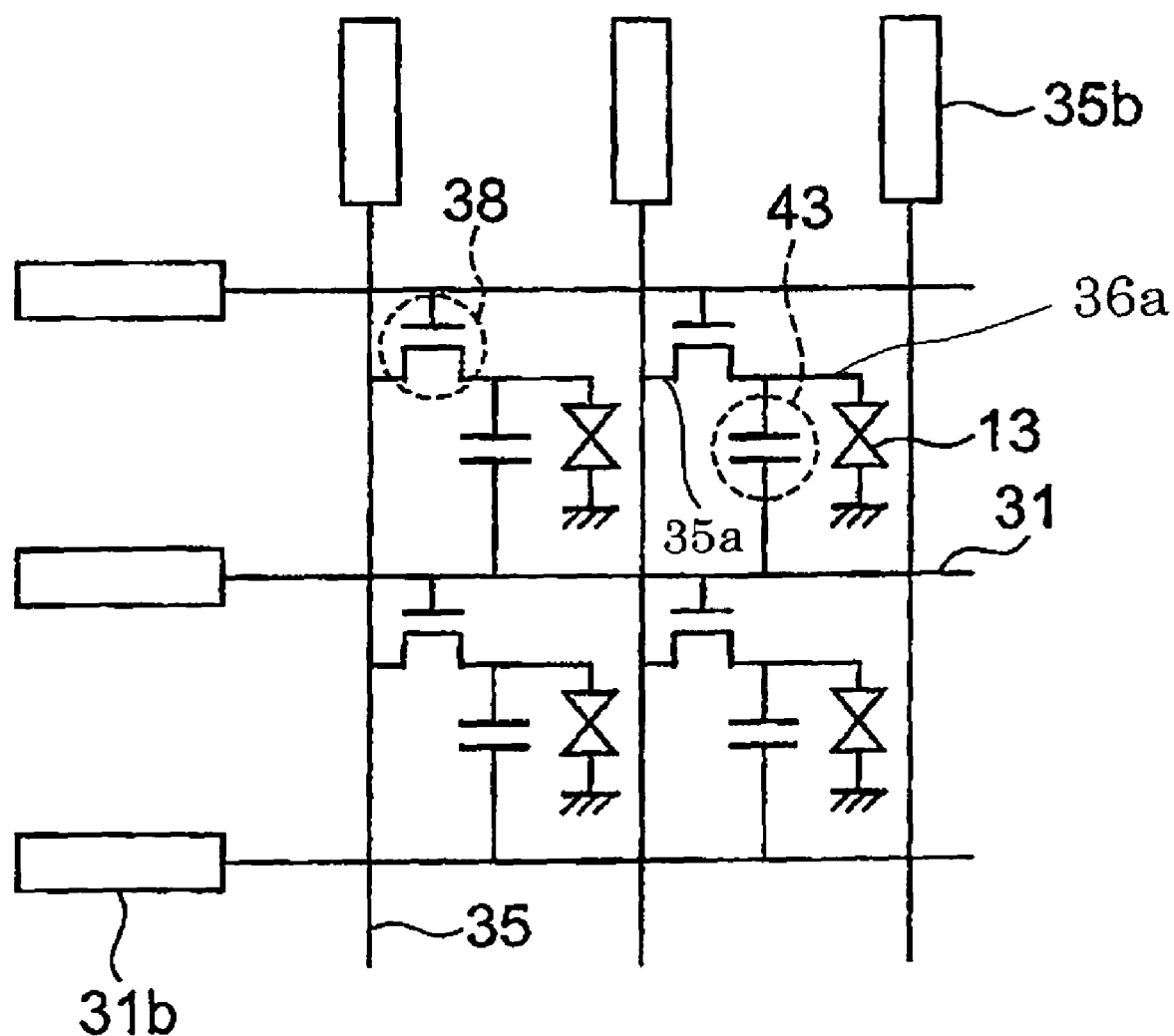
FIG. 3 is a circuit diagram of the LCD device of the first embodiment.

FIG. 3 shows a circuit diagram of a portion of the LCD device 10 of the present embodiment. The LCD device 10 includes a plurality of gate lines 31 connected to respective gate terminals 31b, and a plurality of data lines 35 extending perpendicular to the gate lines 31 and connected to respective data terminals 35b. The gate terminals 31b and data terminals 35b are connected to external signal processing boards disposed for processing image data. The TFT 38 is disposed in the vicinity of an intersection between a gate line 31 and a data line 35, which are connected to the gate electrode 31a and the source electrode 35a, respectively, of the TFT 38.

The drain electrode 36a of the TFT 38 is connected to a corresponding pixel electrode, which sandwiches the LC layer (13 in FIG. 8) in association with a counter electrode. The counter electrode is connected to a ground terminal. The gate terminal 31b supplies a scanning signal through the gate line 31 for switching or driving the TFT 38. The data terminal 35b supplies a data signal through the data line 35 and the TFT 38 to the pixel electrode 19, which stores thereon the data signal as an amount of electric charge.

In FIG. 3, an additional capacitor 43 is connected between the drain electrode 36a of the TFT 38 and an adjacent gate line 31.

In the present embodiment, the configuration wherein the front substrate 12 is implemented as a COA substrate, as well as the configuration wherein the effective rear-substrate thickness is set at 120 μm affords a smaller distance L between the duplicated images. The smaller distance L is sufficient for suppressing parallax, mixed-color and lower-luminance problems as encountered in the conventional transflective LCD device having a pair of polarizing films.

In the present embodiment, the front substrate 12 implemented as a COA substrate may be any substrate so long as the transparent substrate body such as a glass substrate body is provided with switching devices and color filter layers. There is substantially no restriction on the configuration of the switching devices, and the TFTs may be replaced by, for example, MIM diodes. The TFT may have an ordinary staggered structure instead of the reverse-staggered structure. The color filter layers 40 may have any combination instead of the RGB primary colors described above.

In the LCD device of the present embodiment, the structure other than the structure of the front substrate 12 is not restricted to any configuration. For example, the materials for the liquid crystal, alignment film, transparent substrate body and counter electrode may be such generally used in a conventional active-matrix-drive LCD device.

Figure 5:
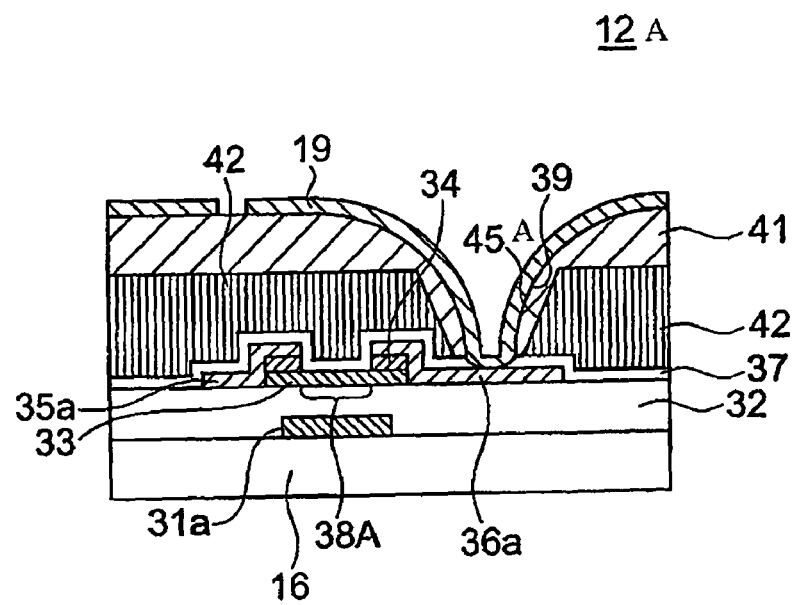
FIG. 5 is a sectional view of a pixel area in a front substrate of an LCD device according to a modification from the first embodiment.
Figure 6:
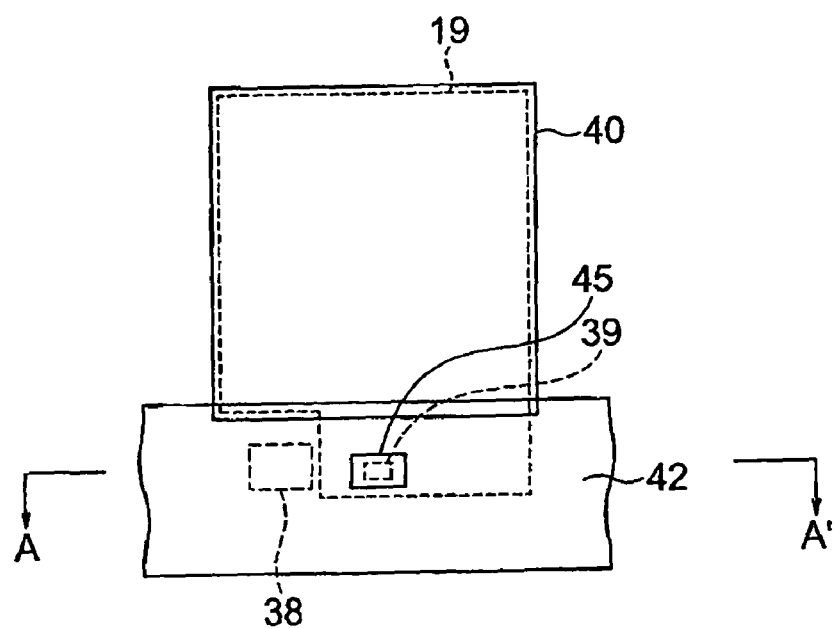
FIG. 6 is a top plan view of the pixel area shown in FIG. 5.

The opening 45 may be formed in the black matrix 42 instead of the color filter layer 40. FIG. 5 shows such a modification wherein the opening 45A is formed in the black matrix 42, and FIG. 6 shows a top plan view thereof. FIG. 5 corresponds to a sectional view taken along line A-A' in FIG. 6. In this modification, the contact hole 39 is formed within the opening 45A formed in the black matrix 42, which overlies the TFTs 38. The color filter layer 40 opposes the entire area of the pixel electrode 19 except for the area of the opening 45 and vicinity thereof. Other configuration of the front substrate 12A in this modification is similar to the corresponding configuration of the front substrate 12 in the first embodiment.

It is to be noted that the black matrix 42 may shield the gate lines 31 as well as the TFTs 38, and may thus be formed in the area other than the area of the color filter layers 40. The opening 45A may include an edge formed by the color filter layer 40 and an opposing edge formed by the black matrix 42 instead of the depicted configuration.

Figure 4A:
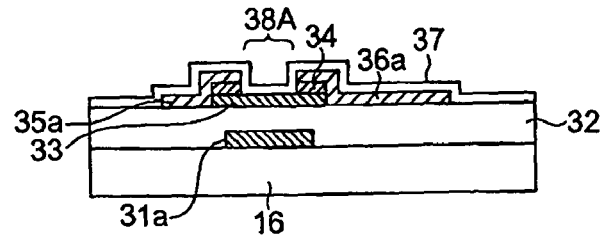
FIGS. 4A to 4H are sectional views showing consecutive steps of fabrication process for manufacturing the front substrate in the LCD device of the first embodiment.

FIGS. 4A to 4H consecutively show steps of a fabrication process for fabricating the front substrate of the present embodiment. A 0.5-mm-thick transparent insulating substrate body 16 is prepared from glass etc., and an array of channel-etched TFTs 38 are formed thereon using a conventional process, as shown in FIG. 4A. The detail of the process for manufacturing the channel-etched TFTs are as follows.

First, a conductive film having a thickness of 100 to 400 nm is deposited on the transparent substrate body 16, followed by patterning the conductive film by using a photolithographic process to form gate lines 31, gate electrodes 31a and gate terminals 31b. The conductive film may include Al, Mo or Cr, for example.

Subsequently, a gate insulating film 32, such as made of silicon nitride, an amorphous silicon layer and an n-type heavily-doped amorphous silicon layer ($n^+$-type silicon layer) are consecutively deposited on the entire area by using a CVD technique, up to thicknesses of around 400 nm, 300 nm and 50 nm, respectively. Thereafter, both the amorphous silicon layer and $n^+$-type silicon layer are patterned by a single-process etching to leave the semiconductor active layer 33 and $n^+$-type amorphous silicon layer overlying the semiconductor active layer 33.

A metallic film such as a Mo or Cr film having a thickness of 100 to 200 nm is then deposited on the gate insulating film 32 as well as on the $n^+$-type silicon layer remaining on the semiconductor active layer 33 by using a sputtering technique. The metallic film is then patterned to form source electrodes 35a, data lines, drain electrodes 36a and data terminals. This patterning step also removes portions of the $n^+$-type silicon layer other than the portions underlying the source electrodes 35a and drain electrodes 36a to leave contact layers 34. The channel-etched TFTs are thus formed.

Thereafter, a plasma CVD process is conducted to form a passivation layer 37 overlying the source electrodes 35a, source lines, drain electrodes 36a and data terminals, the passivation layer 37 being made of inorganic substance such as silicon nitride having a thickness of around 100 to 200 nm.

Figure 4B:
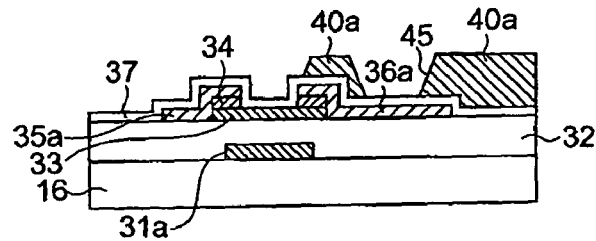

Subsequently, as shown in FIG. 4B, red color photoresist including red pigment dispersed in an acrylic resin is coated onto the structure of FIG. 4A by using a spin-coat technique. The rotational speed in the spin-coating is adjusted so that the resultant color photoresist film is about 1.2 g m thick. A hot plate is then used to pre-bake the red photoresist film by maintaining the same at a temperature of 80 degrees C. for two minutes, followed by exposing the pre-baked photoresist film to exposure light. The resultant film is then developed using a tetra-methyl-ammonium-hydroxide (TMAH) liquid, thereby forming red color filter layers 40a having openings 45 therein within specified pixels. The dimensions of the openings 45 are such that each opening 45 can well receive therein a contact hole 39. A clean oven is then used for baking at a temperature of 220 degrees C. for 60 minutes to cure the red color filter layers 40a.

Figure 4C:
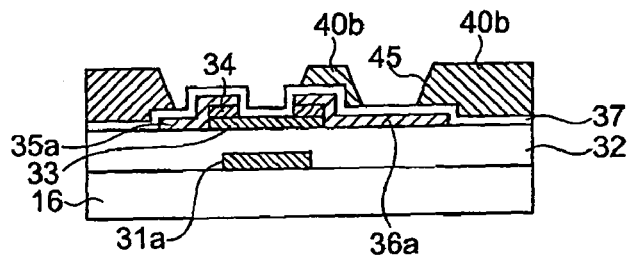
Figure 4D:
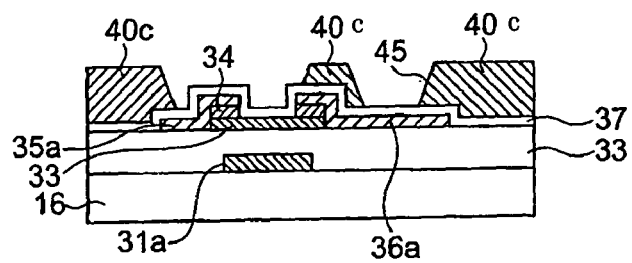

Subsequently, green color filter layers 40b and blue color filter layers 40c are formed similarly to the red color filter layers 40a by using spin-coating and baking techniques within other pixels, as shown in FIGS. 4C and 4D, respectively. It is to be noted FIG. 4C shows a pixel adjacent to the pixel shown in FIG. 4B, whereas FIG. 4D shows another pixel adjacent to the pixels shown in FIG. 4C.

Figure 4E:
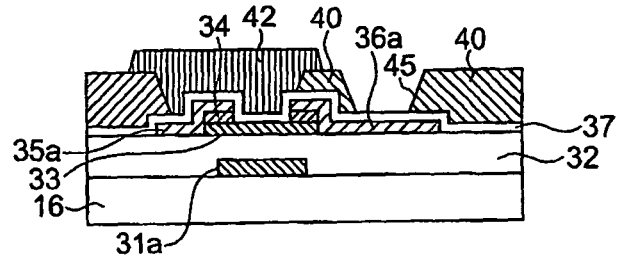

After forming the color filter layers 40a, 40b and 40c as shown in FIGS. 4B to 4D, a black matrix 42 is then formed as shown in FIG. 4E, wherein one of those color filter layers are denoted by numeral 40. The black matrix 42 is made of a photoresist wherein a pigment such as carbon is dispersed in an acrylic resin. In the present embodiment, a material having a viscosity of 20 cP is applied using a spin-coating technique to obtain a film thickness of about 1.5 μm. The black matrix 42 is thus formed in the area other than the openings 45.

Figure 4F:
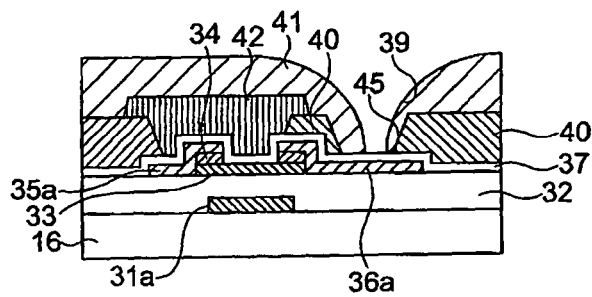

Thereafter, as shown in FIG. 4F, a photoresist film 41 such as transparent acrylic resin film is formed on the entire area for planarization purpose, followed by exposure and development thereof to form contact holes 39 in the photoresist film 41 within the openings 45. The photoresist film 41 is then baked at a temperature of 220 degrees C. for 60 minutes to cure the same, thereby obtaining an overcoat layer 41.

Figure 4G:
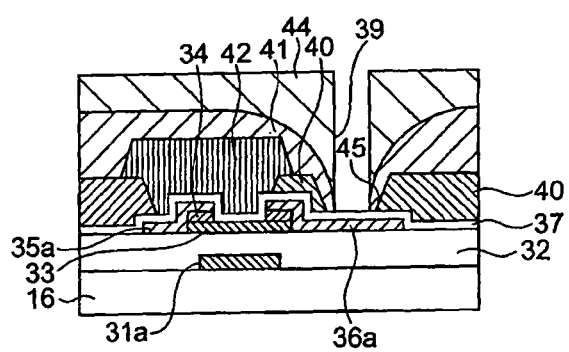

Subsequently, as shown in FIG. 4G, a novolack photoresist film 44 is formed by coating, followed by patterning thereof. By using the patterned novolac photoresist film 44 as an etching mask, the passivation layer 37 is etched to form contact holes 39 therein which reach the drain electrodes 36a. In this step of forming the contact holes 39, unnecessary portions of the passivation layer 37 on the data terminals and unnecessary portions of the gate insulating film 32 on the gate terminals are also removed.

In the present embodiment, since the black matrix 42 is formed after formation of the color filter layers 40, there is substantially no residue in the contact holes 39, whereby the passivation layer 37 is substantially free from an etching defect. In addition, since the contact holes 39 are formed before sputtering of the conductive film which is to be configured as pixel electrodes 19, the contact holes 39 as well as the openings 45 are substantially free from oxidation and contamination problems. This provides a lower electric resistance for the plug connecting the pixel electrode 19 and the drain electrode 36a.

Figure 4H:
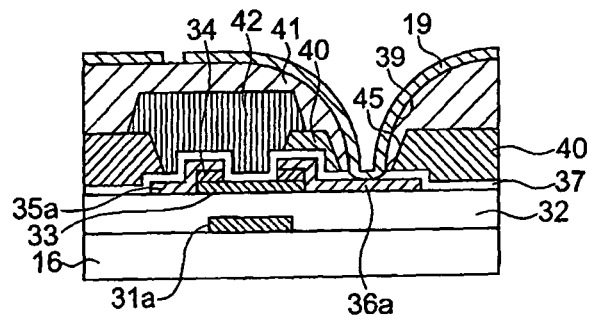

Thereafter, as shown in FIG. 4H, the patterned novolac photoresist film 44 is removed, followed by forming a transparent conductive film such as made of indium-oxide-tin (ITO) on the overcoat layer 41 and drain electrodes 36a exposed within the contact holes 39. The transparent conductive film is then patterned to form pixel electrodes 19. A larger thickness of the transparent conductive film for the pixel electrodes 19 provides a suitable coverage as well as a lower and more stable resistance in connection with the drain electrodes 36a. In consideration of the property of the ITO film, a thickness of about 100 nm is preferable for the transparent conductive film.

Although the thicknesses of the color filter layers 40 and black matrix 42 depend on the materials used therefor, a typical thickness of the as-coated color filter layers is around 1.0 to 1.5 μm whereas a typical thickness of the as-coated black matrix 42 is around 1.0 to 2.0 μm. The overcoat layer 41 may have any thickness so long as the overcoat layer 41 has a suitable planarization function, and the typical thickness of the as-coated overcoat layer 41 is around 2.5 to 4.5 μm.

Subsequently, a transparent substrate body 14 made of polyether-sulfone (PES) resin having a thickness of 0.2 mm is prepared, and a counter electrode 15 made of ITO is formed thereon using a conventional technique, thereby preparing a rear substrate 11. Thereafter, an orientation film is formed on each of the front surface of the counter electrode 15 and the rear surface of the pixel electrodes 19 by using a conventional technique. The orientation film may include a polyimide resin which is to be baked at a lower temperature.

The rear substrate 11 and the front substrate 12 thus prepared are overlapped together using a conventional technique, and the gap between both the substrates 11 and 12 are filled with liquid crystal to obtain an LCD panel 10B shown in FIG. 8. The liquid crystal may be an ordinary twisted nematic liquid crystal doped with a chiral material. The gap of the LCD panel 10B may be controlled as usual in the conventional LCD panel, with a heat-curable epoxy resin being used as a peripheral seal member.

Thereafter, a rear polarizing film 23 provided with an anti-reflection coat is adhered onto the front surface of the front substrate 12, and a layered structure including adhesive layer/rear polarizing film/adhesive layer/luminance increasing film/reflecting film, as viewed in this order from the rear substrate 11, is attached onto the rear surface of the rear substrate 11. Thus, an LCD panel 10B is obtained. In the last step, the resultant LCD panel 10B is combined with the backlight unit 10A to form an integral LCD device 10.

A sample according to the first embodiment of the present invention was manufactured. The backlight unit 10A used herein was an LED backlight unit having a luminance of 1100 cd/m². The polarizing films 23 and 21 were disposed so that the polarizing axis of the front polarizing film 23 is perpendicular to the polarizing axis of the rear polarizing film 21, and the resultant LCD device 10 was operated in a normally-white TN mode.

The sample of the LCD device 10 was evaluated while the backlight unit 10A was turned off, with a result that a parallax of duplicated images was not observed from a viewing direction of 60 degrees or above with respect to the normal line of the LCD panel 10B. This revealed a desirable degree of suppression of the parallax by the present embodiment. The contrast ratio observed within the LCD panel 10B was about 40. The sample was further evaluated while the backlight unit 10A was turned on. The contrast ratio and white luminance observed were 190 and 83 cd/M², respectively.

An LCD device according to a second embodiment of the present invention is similar to the LCD device 10 of the first embodiment except that a polarizing film is used as the rear substrate 21, and thus a dedicated rear polarizing film 21 is not used in the present embodiment. This configuration further reduces the effective rear-substrate thickness for the LCD device, whereby the parallax problem etc. are further suppressed.

The LCD device of the second embodiment may be formed by using a technique such as described in Patent Publication JP-A-2000-122064. In this technique, xenon ion beams are used instead of rubbing the orientation film, to thereby reduce the temperature rise of the polarizing film upon forming the orientation film and reduce the mechanical stress caused therein. Further, a stable orientation film can be formed on the polarizing film.

The LCD device of the second embodiment may be formed by using a technique such as described in Patent Publication JP-A-2001-174829. In this technique, liquid crystal is dropped as a droplet on one of the front and rear substrates, before overlapping both the substrates.

In the present embodiment, by configuring the front substrate 12 as a COA substrate, the number of heat treatment steps encountered by the rear substrate can be reduced. It is to be noted herein that ordinary thermal steps during which the substrate is heated in the fabrication process includes film deposition steps such as by CVD or sputtering, photolithographic steps, and baking steps for the color filter layers. Since these thermal steps are not applied to the rear substrate in the present embodiment, the rear substrate can be configured by a polarizing film, which is generally susceptible to a thermal deformation, and has a smaller effective rear-substrate thickness. The xenon-ion-beam technique allows an orientation film to be formed on the polarizing film instead of on the glass substrate body.

The present invention has advantages, particularly on an LCD device which defines thereon a plurality of pixels arranged at a pitch of 0.33 mm or less. The distance between the LC layer and the reflecting film is preferably between 0.1 mm and 0.6 mm. A preferable combination of the pitch of the pixel and the distance is such that the pitch is 0.28 mm or less and the distance is 0.7 mm or less. In this case, it is more preferable that the distance be between 0.1 mm and 0.5 mm.

Since the above embodiments are described only for examples, the present invention is not limited to the above embodiments and various modifications or alterations can be easily made therefrom by those skilled in the art without departing from the scope of the present invention.

What is claimed is:

1. An active-matrix-drive liquid crystal display (LCD) device comprising a front substrate including a front polarizing film disposed on a front side of said front substrate, a rear substrate including a rear polarizing film disposed on a rear side of said rear substrate, a liquid crystal (LC) layer sandwiched between said front substrate and said rear substrate, and a reflecting film disposed on a rear side of said rear polarizing film, wherein a distance between said LC layer and said reflecting film is not larger than 0.8 mm, and a thickness of said LC layer is less than a thickness of both the rear substrate and a thickness of the rear polarizing film, wherein said LCD device defines thereon a plurality of pixels arranged at a pitch of not larger than 0.33 mm, and said rear substrate has a smaller thickness than said front substrate, and wherein one of said rear substrate and said front substrate mounts thereon, on a surface near said LC layer, color filter layers.

2. The active-matrix-drive LCD device according to claim 1, wherein said plurality of pixels are arranged at a pitch of not larger than 0.33 mm.

3. The active-matrix-drive LCD device according to claim 1, wherein said distance is not smaller than 0.1 mm and not larger than 0.6 mm.

4. The active-matrix-drive LCD device according to claim 1, wherein said pitch is not larger than 0.28 mm and said distance is not larger than 0.7 mm.

5. The active-matrix-drive LCD device according to claim 4, wherein said distance is not smaller than 0.1 mm and not larger than 0.5 mm.

6. The active-matrix-drive LCD device according to claim 1, wherein said front substrate is an active-matrix-drive substrate.

7. The active-matrix-drive LCD device according to claim 6, wherein said front substrate mounts thereon the color filter layers.

8. The active-matrix-drive LCD device according to claim 7, wherein said rear substrate and said rear polarizing film are configured as a single polarizing film.

9. The active-matrix-drive LCD device according to claim 1, wherein said LC layer is a nematic LC layer.

10. The active-matrix-drive LCD device according to claim 1, further comprising a luminance increasing film disposed between the reflecting film and the rear polarizing film.

11. The active-matrix-drive LCD device according to claim 1, further comprising an adhesive layer having a plurality of fine particles contained within the adhesive layer, disposed between the reflecting film and the rear polarizing film, whereby the fine particles disperse light.

12. The active-matrix-drive LCD device according to claim 1, wherein the thickness of the LC layer is approximately 5 μm.

13. The active-matrix-drive LCD device according to claim 1, wherein a rear substrate and a rear polarizing film are interposed between the LC layer and the reflecting film.

14. The active-matrix-drive LCD device according to claim 13, wherein the rear substrate, a first adhesive layer, the rear polarizing film, a second adhesive layer and a luminance increasing film are interposed between the LC layer and the reflecting film.

15. The active-matrix-drive LCD device according to claim 1, wherein the distance between said LC layer and said reflecting film is not larger than 1.8 times the pixel pitch.

16. The active-matrix-drive LCD device according to claim 1, further comprising at least one alignment film disposed between said front substrate and said rear substrate.

17. An active-matrix-drive liquid crystal display (LCD) device comprising a front substrate including a front polarizing film disposed on a front side of said front substrate, a rear substrate including a rear polarizing film having a smaller thickness than said front substrate disposed on a rear side of said rear substrate, a liquid crystal (LC) layer sandwiched between said front substrate and said rear substrate, and a luminance increasing film disposed on a rear side of said rear polarizing film, wherein a distance between said LC layer and said luminance increasing film is not larger than 0.8 mm, and a thickness of said LC layer is less than a thickness of both the rear substrate a thickness of and the rear polarizing film, wherein said LCD device defines thereon a plurality of pixels arranged at a pitch of not larger than 0.33 min.

18. The active-matrix-drive LCD device according to claim 17, wherein the luminance increasing film comprises a transflective film.

19. The active-matrix-drive LCD according to claim 18, wherein the transflection film comprises a metal-coated polymer film.

20. The active-matrix-drive LCD device according to claim 18, wherein the transflection film comprises a dielectric stacked film.

21. The active-matrix-drive LCD device according to claim 18, further including a backlight unit illuminating the transflective film.

22. The active-matrix-drive LCD device according to claim 17, wherein the luminance increasing film comprises a low-reflection film.

23. The active-matrix-drive LCD device according to claim 17, wherein the luminance increasing film comprises an all-reflection film.

* * * * *

UNITED STATES PATENT AND TRADEMARK OFFICE
CERTIFICATE OF CORRECTION

| | | |
|---|---|---|
| PATENT NO. | : 7,787,078 B2 | |
| APPLICATION NO. | : 11/133424 | |
| DATED | : August 31, 2010 | |
| INVENTOR(S) | : Hirai et al. | |

It is certified that error appears in the above-identified patent and that said Letters Patent is hereby corrected as shown below:

Claim 1, Col. 12, line 40 "of both the" should be --of the--.

Claim 17, Col. 14, line 8 "of both the" should be --of the--.

Signed and Sealed this
Eighteenth Day of December, 2012

David J. Kappos
*Director of the United States Patent and Trademark Office*